(12) United States Patent
Connor

(10) Patent No.: US 7,957,061 B1
(45) Date of Patent: Jun. 7, 2011

(54) DEVICE WITH ARRAY OF TILTING MICROCOLUMNS TO DISPLAY THREE-DIMENSIONAL IMAGES

(75) Inventor: Robert A. Connor, Minneapolis, MN (US)

(73) Assignee: Holovisions LLC, Minneapolis, MN (US)

( * ) Notice: Subject to any disclaimer, the term of this patent is extended or adjusted under 35 U.S.C. 154(b) by 260 days.

(21) Appl. No.: 12/317,856

(22) Filed: Dec. 30, 2008

Related U.S. Application Data (60) Provisional application No. 61/011,200, filed on Jan. 16, 2008.

(51) Int. Cl.
*G02B 27/22* (2006.01)

(52) U.S. Cl. ........... 359/463; 359/462; 359/464; 348/59

(58) Field of Classification Search .................. 359/463, 359/462, 464; 348/54, 59
See application file for complete search history.

(56) References Cited

U.S. PATENT DOCUMENTS

| | | | |
|---|---|---|---|
| 3,199,116 A | 8/1965 | Ross | |
| 4,692,878 A | 9/1987 | Ciongoli | |
| 5,300,942 A | 4/1994 | Dolgoff | |
| 5,602,679 A | 2/1997 | Dolgoff et al. | |
| 5,760,849 A * | 6/1998 | Omae et al. | 349/5 |
| 5,790,086 A | 8/1998 | Zelitt | |
| 5,900,982 A | 5/1999 | Dolgoff et al. | |
| 5,986,811 A | 11/1999 | Wohlstadter | |
| 5,991,073 A * | 11/1999 | Woodgate et al. | 359/462 |
| 6,014,259 A | 1/2000 | Wohlstadter | |
| 6,201,565 B1 | 3/2001 | Balogh | |
| 6,259,450 B1 | 7/2001 | Chiabrera et al. | |
| 6,329,963 B1 | 12/2001 | Chiabrera et al. | |
| 6,344,837 B1 | 2/2002 | Gelsey | |
| 6,437,920 B1 | 8/2002 | Wohlstadter | |
| 6,496,218 B2 * | 12/2002 | Takigawa et al. | 348/42 |
| 6,791,512 B1 | 9/2004 | Shimada | |
| 6,795,241 B1 | 9/2004 | Holzbach | |
| 6,798,390 B1 | 9/2004 | Sudo et al. | |
| 6,929,369 B2 | 8/2005 | Jones | |
| 7,123,287 B2 | 10/2006 | Surman | |
| 7,167,313 B2 | 1/2007 | Wohlstadter | |
| 7,297,474 B2 | 11/2007 | Aizenberg et al. | |
| 2005/0111100 A1 | 5/2005 | Mather et al. | |
| 2005/0248972 A1 | 11/2005 | Kondo et al. | |
| 2005/0270645 A1 | 12/2005 | Cossairt et al. | |
| 2005/0285936 A1 | 12/2005 | Redert et al. | |
| 2006/0158729 A1 | 7/2006 | Vissenberg et al. | |
| 2006/0244918 A1 | 11/2006 | Cossairt et al. | |
| 2007/0035829 A1 | 2/2007 | Woodgate et al. | |
| 2007/0058127 A1 | 3/2007 | Mather et al. | |
| 2007/0058258 A1 | 3/2007 | Mather et al. | |
| 2007/0097019 A1 | 5/2007 | Wynne-Powell et al. | |
| 2008/0007511 A1 | 1/2008 | Tsuboi et al. | |
| 2008/0117289 A1 | 5/2008 | Schowengerdt et al. | |
| 2008/0158671 A1 * | 7/2008 | Lee | 359/462 |
| 2008/0192111 A1 | 8/2008 | Ijzerman | |
| 2008/0204871 A1 | 8/2008 | Mather et al. | |
| 2008/0273242 A1 | 11/2008 | Woodgate et al. | |

* cited by examiner

*Primary Examiner* — Audrey Y Chang (57) ABSTRACT

This invention is a device for displaying three-dimensional images using an array of tilting microcolumns. It can create high-resolution, large-scale, moving, three-dimensional images that can be viewed by people in different locations, with full parallax, without special eyewear. Unlike currently available methods, this invention: does not require special eyewear, works for multiple viewers, provides parallax in all directions, does not have a very restrictive viewing zone, does not produce only transparent images, does not require coherent light, is scalable to large displays, does not require liquid movement to adjust lens shape, and does not require complex systems to individually control large numbers of lenses.

7 Claims, 7 Drawing Sheets

DEVICE WITH ARRAY OF TILTING MICROCOLUMNS TO DISPLAY THREE-DIMENSIONAL IMAGES

CROSS-REFERENCE TO RELATED APPLICATIONS

This patent application claims the priority benefit of provisional patent application Ser. No. 61/011,200 entitled "System for displaying three-dimensional video images" filed on Jan. 16, 2008 by Robert A. Connor of Holovisions LLC.

FEDERALLY SPONSORED RESEARCH

Not Applicable

SEQUENCE LISTING OR PROGRAM

Not Applicable

BACKGROUND

1. Field of Invention

This invention relates to the display of three-dimensional images.

2. Background and Related Art

Currently, there are four general approaches to displaying three-dimensional images: (1) methods requiring special eyewear; (2) methods using three-dimensional display surfaces; (3) methods using holography; and (4) methods using parallax barriers and lenses.

(1) Special Eyewear

Several methods of three-dimensional imaging require special eyewear. The eyewear presents different images to a viewer's right and left eyes. Such methods involving only two different images are generally called "stereoscopic." Many eyewear-based methods have a common source for right and left eye images, but the two different images are differentiated by two different types of lenses on the eyewear. For example, the lenses may differ by color, polarization, or sequential shutters. Other eyewear-based methods involve two different sources for right and left eye images, such as two independent mini-screens close to the eyes.

Disadvantages of special eyewear methods include: the inconvenience of having to wear special eyewear; the lack of multiple perspectives, occlusion, and image shifting in response to viewer movement; and eye strain or damage from conflicting convergence vs. accommodation cues that stress the human visual system. Lack of multiple perspectives, occlusion, and response to image shifting in response to viewer movement can be partially addressed by adding systems that track viewer motion, but these are also inconvenient and are difficult to apply in multi-viewer situations.

(2) Three-Dimensional Display Surfaces

Several methods of three-dimensional imaging use display surfaces that are themselves three-dimensional. Variations in these display surfaces include whether these surfaces are "full-scale" (on the same scale as displayed images) or "micro-scale" (on the same scale as pixels comprising the displayed images), whether these surfaces are stationary or moving, and whether these surfaces emit or reflect light.

Full-scale three-dimensional display surfaces are generally called "volumetric." Stationary volumetric displays often include a series of parallel two-dimensional panels whose transparency can be varied. These panels emit or reflect light to create two-dimensional image slices which, when viewed together, form a three-dimensional image. Less commonly, a translucent gel can be used. Moving volumetric displays often have a spinning (or otherwise cyclically moving) two-dimensional structure that emits or reflects light. The light paths formed as its light emitting or reflecting members sweep through space create a three-dimensional image. Disadvantages of full-scale three-dimensional display surfaces include: they are cumbersome to construct and use for large-scale images with multiple viewers; and displays with transparent or translucent members produce transparent ghost-like images that are not desirable for many purposes.

Micro-scale three-dimensional display surfaces are less well-developed than full-scale surfaces and do not yet have a commonly-used label, but can be thought of as "three-dimensional pixels." In theory, the concept of a three-dimensional pixel is a pixel comprised of an array of sub-pixels, each with image directionality as well as image content. Three-dimensional pixels could be in the form of a cube, sphere, or other shape. The concept of three-dimensional pixels has potential, but entails significant technical and practical challenges that have not yet been resolved. It is very challenging to create an extremely small structure with a sufficient number of fixed radiating "sub-pixels" to produce an image with reasonable resolution from different perspectives. Also, even if such structures of multiple "sub-pixels" can be created, it is very challenging to get them sufficiently close together for image precision without one structure blocking views of an adjacent structure. If the reader will pardon a colorful analogy, it is like trying to design a city block full of several-story apartment buildings wherein people in each apartment all want a view of the river; it is tough to do.

(3) Holographic Animation

Holographic animation has tremendous potential, but is still at an early stage with many technical challenges yet unresolved. Current systems for animated holographic imaging produce relatively small translucent images with limited viewing zones and poor image resolution. They also require coherent light with associated expense and safety concerns. Some day holographic animation may become the method of choice for three-dimensional imaging, but thus far it remains very limited.

(4) Parallax Barriers and Lenses

There are many methods of three-dimensional imaging using parallax barriers, lenticular lenses, fly's eye lenses, variable focal-length lenses, and combinations thereof.

Parallax barriers allow different images to reach a viewer's right and left eyes by selectively blocking portions of images, generally via a layer that is close to the image surface. Light-blocking vertical strips and light-transmitting vertical slits are often used as parallax barriers. Some parallax barriers are stationary. Other parallax barriers move in response to viewer head motion in systems that track this motion. Lenticular lenses are (semi-circular) columnar lenses. They are generally combined in vertical arrays near an image surface. Lenticular lenses direct different views (generally vertical image strips) to a viewer's right and left eyes. Parallax barriers and lenticular lenses can be used together.

Lenticular lenses and parallax slits only provide parallax in one direction. Some parallax in another direction can be achieved by adding a viewer head tracking system and varying image content to reflect viewer head motion, but this is cumbersome for one viewer and problematic for multi-viewer applications. Another disadvantage of parallax barriers and lenticular systems are "pseudoscopic" images outside a severely-restricted viewing zone. "Pseudoscopic" views occur when the images that the eyes see are improperly reversed. "Pseudoscopic" views can cause eye strain, headaches, and other health problems.

A "fly's eye" lens is an array of convex lenses. Three-dimensional imaging using a fly's eye lens is called "integral photography." A fly's eye lens can display a large number of small two-dimensional images from different perspectives. Ideally, as a viewer moves, the viewer sees the same point from different perspectives. Although this concept has considerable potential, it involves significant practical challenges. It is difficult to have a sufficient number of two-dimensional images to achieve high image resolution on a very small scale structure. Viewing zones remain limited. Production of fly's eye screens is also relatively expensive.

New methods have also been proposed for creating three-dimensional images using lenses whose focal lengths can be changed in real time. Such lenses include electro-wetting controlled droplet lenses and liquid-crystal microlenses. Lenses whose focal lengths can be changed are called "dynamic" or "active" lenses. Although application of such lenses to the creation of three-dimensional images has considerable potential, there remain many technical challenges. Systems to independently adjust the focal lengths of a large number of microlenses are complex. Liquids may not move sufficiently rapidly to adjust focal length fast enough for three-dimensional viewing. Viewing zones remain limited.

(5) Summary of Background and Related Art

To summarize the related art, considerable work has been devoted to create ways to display three-dimensional images. However, all of the current methods still have disadvantages. Some methods require inconvenient eyewear and cause eye strain. Some methods require viewer tracking that is inconvenient and does not work well for multiple viewers. Some methods have restrictive viewing zones. Some methods produce transparent, ghost-like images. Some methods produce very small, low-resolution images and require use of coherent light. Some methods have significant unresolved technical challenges concerning the creation of complex microstructures. Some methods do not adjust rapidly enough to display moving three-dimensional images. None of the current methods provide a practical means to create high-resolution, large-scale, moving, three-dimensional images that can be viewed by people in different locations, with full parallax, without special eyewear. The invention disclosed herein addresses these disadvantages.

SUMMARY

This invention is a device for displaying three-dimensional images that comprises an image display surface (wherein this image display surface emits or reflects light to display an image comprised of multiple small image elements such as pixels) and an array of tilting microcolumns (wherein the image contents displayed by small image elements are coordinated with the movement of the tilting microcolumns, through which those image contents pass, to form a pattern of light rays with the proper content and directionality so as to create perception of three-dimensional images).

This invention provides a novel and practical means to create high-resolution, large-scale, moving, three-dimensional images that can be viewed by people in different locations, with full parallax, without special eyewear. Unlike currently available methods, this invention: does not require special eyewear, works for multiple viewers, provides parallax in all directions, does not have a very restrictive viewing zone, does not produce only transparent images, does not require coherent light, is scalable to large displays, does not require liquid movement to adjust lens shape, and does not require complex systems to individually control large numbers of lenses.

DRAWINGS

Introduction

FIGS. 1 through 14 show some examples of how an array of tilting microcolumns can be used to display three-dimensional images. They do not limit the full generalizability of the claims. The claims can be applied in many other examples.

FIGS. 1 and 2 provide an introductory perspective on what is required to have a two-dimensional image display surface that creates the perception of three-dimensional images, with full parallax, when viewed by people in different locations.

FIGS. 3 through 8 show a top-down cross-sectional perspective of one example of how an array of tilting microcolumns can redirect light rays from small image elements on a display surface along different lines-of-sight. FIGS. 3 through 6 show a moving series wherein the array of tilting microcolumns tilts to display the content of different small image elements along different lines-of-sight (exiting the image display surface at different angles).

DETAILED DESCRIPTION

FIGS. 1 through 14 show some examples of how three-dimensional imaging may be achieved by using an array of tilting microcolumns. However, they do not limit the full generalizability of the claims given later. Many other examples and variations may be created based on the claims.

Figure 1:
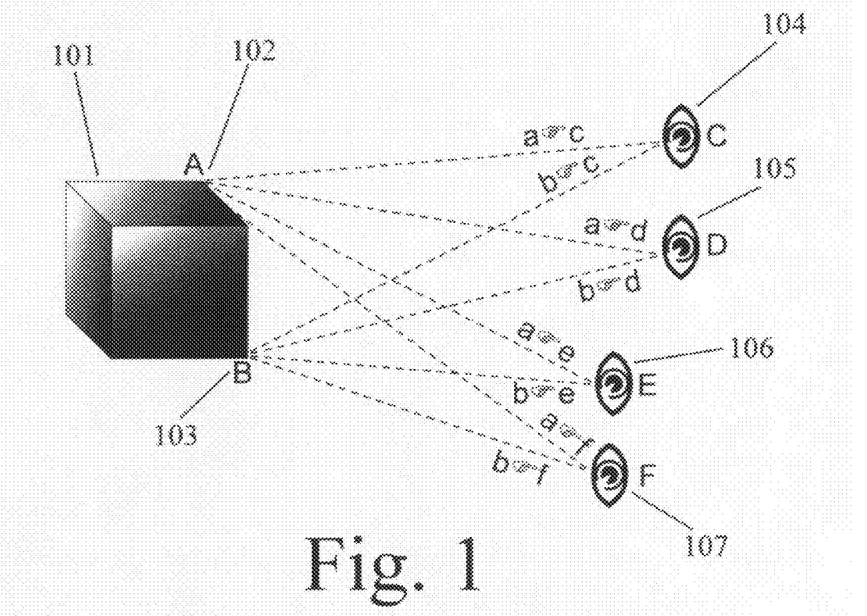
FIG. 1 shows a top-down perspective of an actual cube being seen by two viewers. Specific details are shown for the lines-of-sight from two points on that cube to the eyes of the two viewers.
Figure 2:
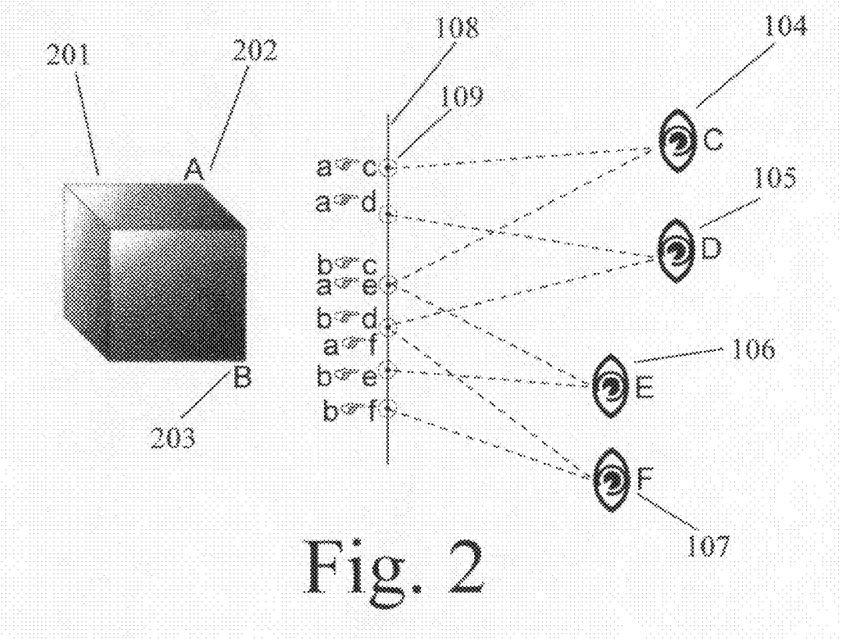
FIG. 2 shows a top-down perspective of a three-dimensional image of a virtual cube based on the actual cube, or at least two points thereof. Perception of those two points on the virtual cube is accomplished by recreating the original image display elements along the original lines-of-sight for the actual points on the actual cube. To reduce clutter in these figures, details are only shown for two points on the cube. However, the concepts apply to other points on the cube. A display system that is able to faithfully display these two points in three-dimensions would be able to display the entire virtual cube in three-dimensions.

FIGS. 1 and 2 provide a conceptual introduction to what types of image elements and light beam directions are required in order to have a two-dimensional surface create the appearance of three-dimensional images, with full parallax, when viewed by people in different locations. In this example, the phrase "small image element" refers to a pixel.

In other examples, the term "small image element" could be one of a different type of small image element, wherein these small elements are combined to form an overall image. The creation of two-dimensional images only requires small image elements with image content (such as image color and intensity) and two-dimensional location (such as location in a two-dimensional array). The creation of three-dimensional images from a generally two-dimensional display surface requires small image elements to have appropriate line-of-sight directionality (e.g. display angle) as well as content and two-dimensional location. Creating three-dimensional images from a generally two-dimensional display surface often requires different content to be viewed from the same point from different angles.

FIG. 1 shows a top-down perspective of two sample points, point 102 (also labeled "A") and point 103 (also labeled "B"), on actual cube 101 which is seen by two viewers in different locations. One viewer is represented by that viewer's right eye 104 (also labeled "C") and left eye 105 (also labeled "D"). A second viewer is represented by that viewer's right eye 106 (also labeled "E") and left eye 107 (also labeled "F").

To avoid the clutter of showing lines-of-sight from all of the points on the cube to all four viewer eyes, FIG. 1 shows line-of-sight detail for only the two points, 102 (A) and 103 (B). However the concepts also apply to creating images of a large number of points on the cube. A system that can faithfully recreate eight points of view for two points on the cube can do so for many other points on the entire cube. FIG. 1 shows the eight lines-of-sight, from each of the two points to each of the four eyes. Each line-of-sight is labeled according the directional path of the light ray, starting with the lower-case letter of the originating point (a or b) on the cube and ending with the letter of the receiving eye (c,d,e, or f). For example, the line-of-sight from point "A" to eye "C" is labeled "a→c".

In FIG. 2, there is no longer an actual cube. Instead, there is a three-dimensional image of a virtual cube as perceived by the two viewers. To be precise, to reduce diagram clutter FIG. 2 only shows the lines-of-sight required to create perception of two points, 202 (A) and 203 (B). It does not show all lines-of-sight for the entire virtual cube 201. However, as mentioned earlier, the general concepts could be applied to many points on the cube so as to create a three-dimensional image of the entire virtual cube 201. Accordingly, as a conceptual introduction to the overall imaging process, the entire virtual cube 201 is shown in FIG. 2.

In the example shown in FIG. 2, several image display points, including point 109, are shown along a cross-section of two-dimensional image display surface 108. From these image display points, the eight original lines-of-sight radiate outwards from the two-dimensional surface toward the viewers at the appropriate angles. This creates three-dimensional perception of points 202 (A) and 203 (B) on virtual cube 201. The means by which these image elements are created and these lines-of-sight are directed along different angles is not specified here in FIG. 2, but it is specified in figures that follow. FIG. 2 is intended to provide a conceptual introduction to what is needed, in terms of display content and lines-of-sight, to create three dimensional images. This sets the stage and provides context for the specific examples in the figures that follow.

FIGS. 3 through 8 show a top-down cross-sectional perspective of one example of how an array of tilting microcolumns provides the ability to control the lines-of-sight for passage of light rays from small image elements on the display surface. In this example, each tilting microcolumn allows passage of light rays along different lines-of-sight from the same small image element on a display surface, allowing the perception of different content when the small image element is viewed from different directions. This allows three-dimensional imaging, with full parallax, from people in different locations.

Figure 3:
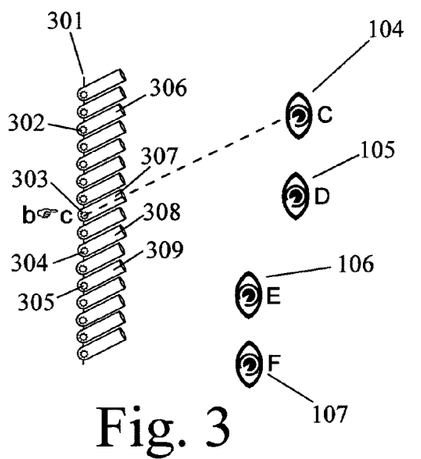

FIGS. 3 through 6 show a progressive sequence wherein the array of tilting microcolumns is tilting to display the content of different small image elements along different lines-of-sight (exiting the image display surface at different angles). FIG. 3 shows a top-down cross-sectional perspective of an array of small image elements (including 302, 303, 304, and 305), individually enclosed by an array of tilting microcolumns (including 306, 307, 308, and 309) that are attached via swiveling means to display surface 301.

In the example shown in FIG. 3, the small image elements (302, 303, 304, or 305) are Light Emitting Diodes (LEDs). In other examples, the small image elements may be different types of light-emitting elements (such as points on a back-lit screen) or light-reflecting elements (such as points on a front-lit screen or mirror). There are many methods in the prior art by which images can be recorded and reproduced in two-dimensional arrays, so they are not specified here.

In the example shown in FIG. 3, the tilting microcolumns (306, 307, 308, and 309) are hollow cylindrical columns with: opaque walls; a rounded and closed end that encloses a small image element (302, 303, 304, or 305, respectively) and is attached via a swiveling means to display surface 301; and an open end facing away from the display surface 301 out of which light from the small image element exits along a particular line-of-sight. In another example, tilting microcolumns 306, 307, 308, and 309 could be made from a solid transparent substance such as glass, crystal, or polymer. In another example, tilting microcolumns 306, 307, 308 and 309 could be hollow hexagonal columns with shared opaque walls made from flexible, stretchable material.

Figure 4:
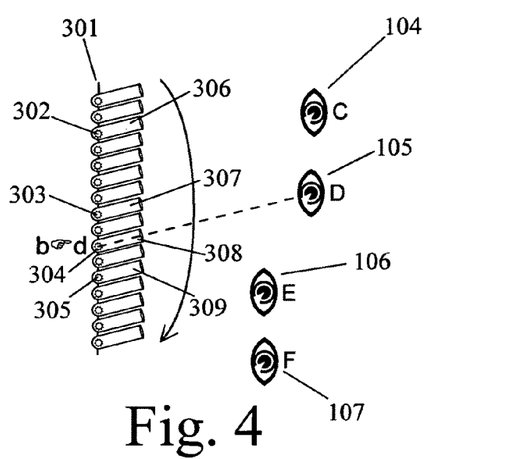
Figure 5:
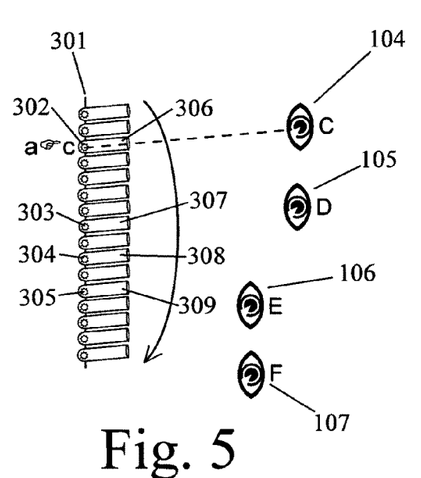
Figure 6:
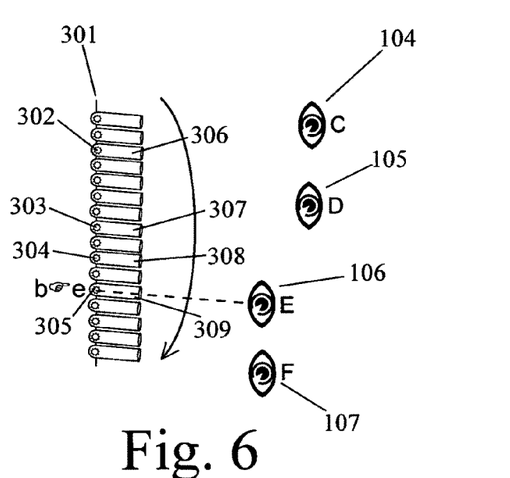

In FIG. 3, image content concerning cube point "B" along line of sight "b→c" is displayed by small image element 303 and passes through the hollow longitudinal axis of microcolumn 307 toward eye 104 (C). This recreates the original "b→c" line-of-sight. In FIG. 4, the array of tilting microcolumns have tilted slightly so that microcolumn 308, which encapsulates small image element 304, is properly angled to direct content concerning cube point "B" along line-of-sight "b→d" towards eye 105 (D). In FIG. 5, the tilting continues. In FIG. 5, the array has tilted further so that microcolumn 306 is now properly angled to direct content concerning cube point "A" along line-of-sight "a→c" from small image element 302 towards eye 104 (C). In FIG. 6, the tilting continues and now microcolumn 309 is properly angled to direct content concerning cube point "B" along line-of-sight "b→e" from small image element 305 towards eye 106 (E).

Figure 7:
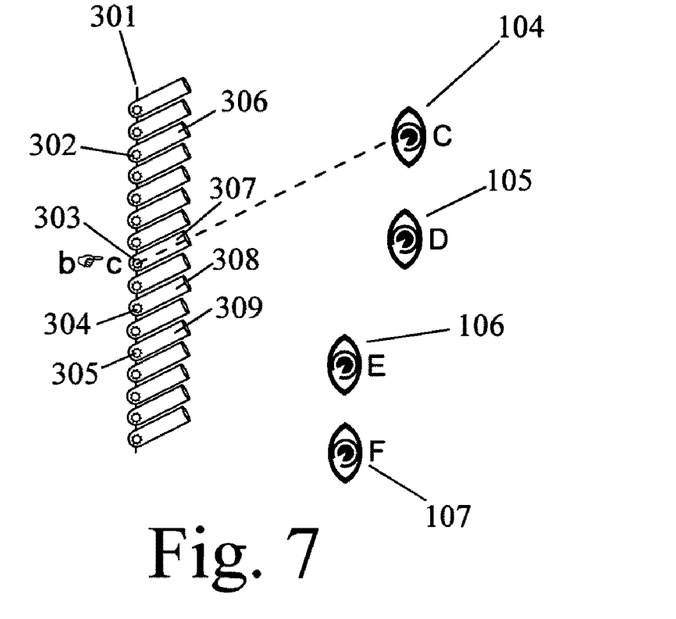
FIGS. 7 and 8 show how this device can display different content from different lines-of-sight from the same small image element.
Figure 8:
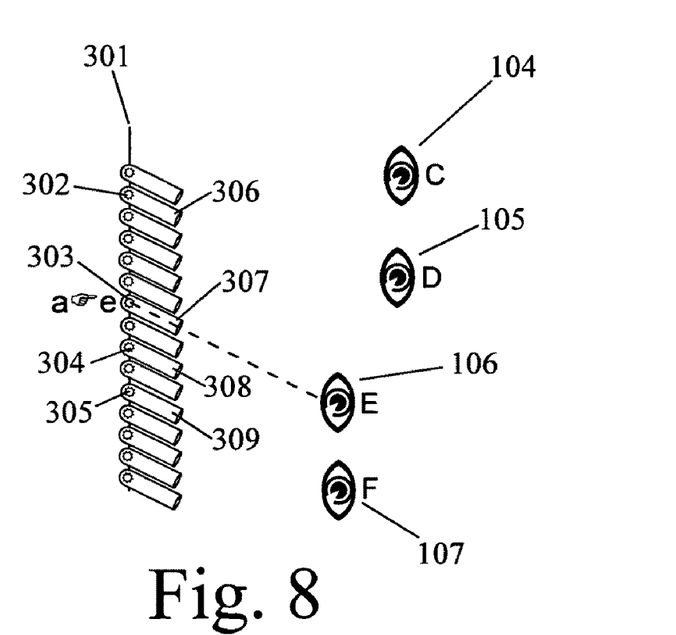

FIGS. 3 through 6 just demonstrated how an array of tilting microcolumns can direct content from different small image elements along different lines-of-sight. FIGS. 7 and 8 now demonstrate how an array of tilting microcolumns can also direct content from the same small image element along different lines-of-sight. This is important for creating three-dimensional images. In FIG. 7, the tilt of microcolumn 307 allows it to display and direct content concerning cube point "B" along line-of-sight "b→c" from small image element 303 towards eye 104 (C). In FIG. 8, this same column has been tilted so as to allow it to display and direct content concerning cube point "A" along line-of-sight "a→e" from the same small image element towards eye 106 (E).

When the tilting motion is sufficiently rapid, and the image display is properly coordinated with the tilting motion, then both images are viewed virtually simultaneously due to image persistence in human visual processing. The ability of this device to display different images from the same small image element when viewed from different directions allows perception of three-dimensional images, with full parallax, by people in different positions.

Figure 9:
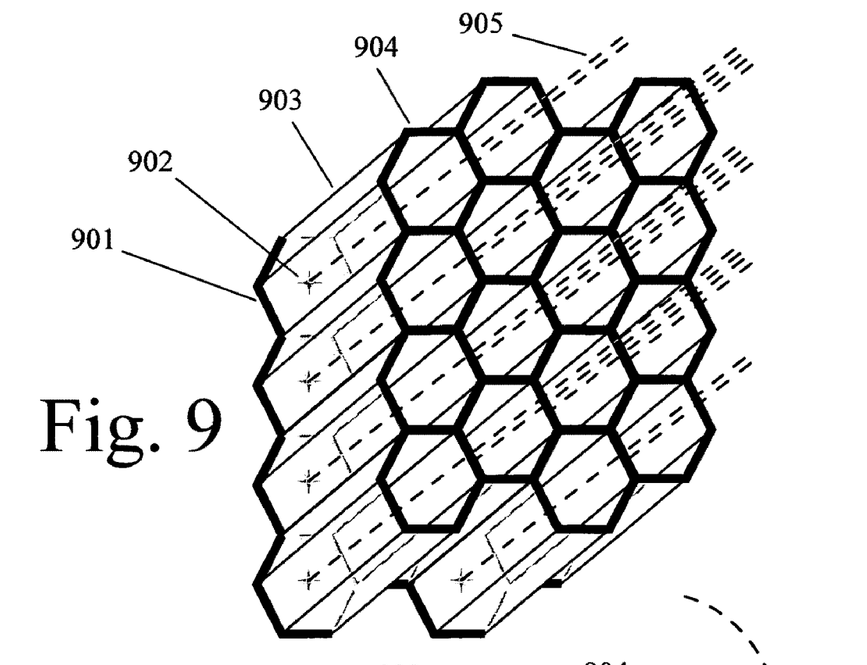
FIGS. 9 and 10 show an oblique perspective of an array of tilting microcolumns with hexagonal cross-sections that are held together by a moving honeycomb structure, as the structure tilts up and down.
Figure 10:
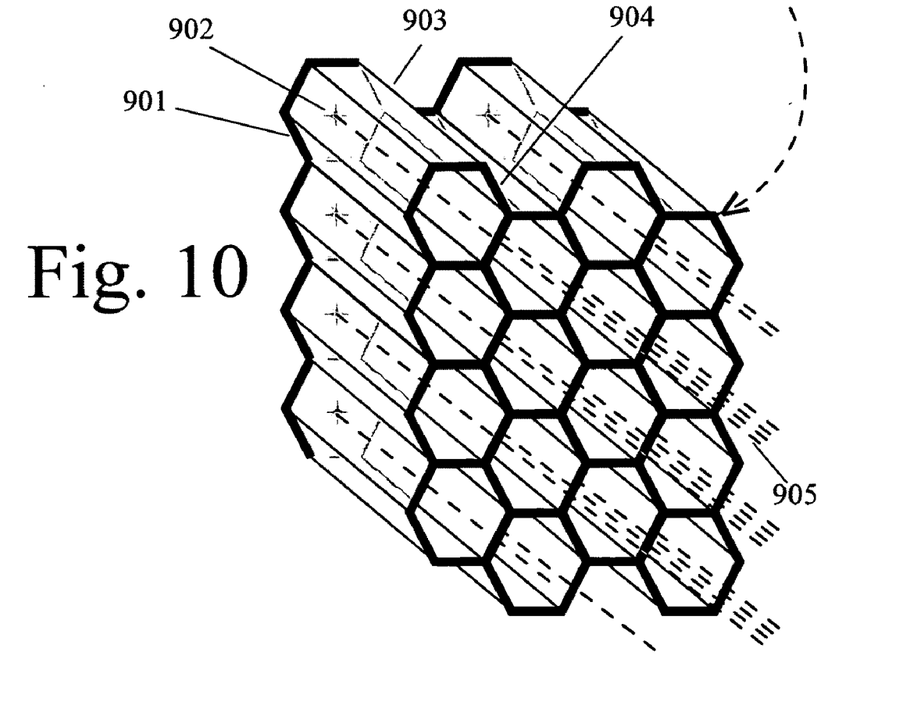

FIGS. 9 and 10 show an oblique perspective of an example of an array of tilting microcolumns with hexagonal cross-sections that are held together by a moving honeycomb structure. The hexagonal structure is shown tilting up and down in FIGS. 9 and 10. In this example, the tilting microcolumns are hollow hexagonal columns with shared opaque walls made from flexible, stretchable material. Specifically, in FIG. 9, the end of one microcolumn 901 that is closest to the image display surface is a hexagon. This hexagonal end 901 encloses small image element 902 on the image display surface. In this example, small image element 902 is an LED. In this example, the walls of this microcolumn 903 are opaque stretchable material and the microcolumns share walls with each other. The microcolumns in this example are hollow. The end 904 of this microcolumn facing away from the image display surface is also a hexagon.

The end 904 of this microcolumn is joined with the ends of other microcolumns in the array to form a moveable honeycomb structure that is generally parallel to the image display surface. In this example, the honeycomb surface can be kept relatively parallel to the image display surface even when it moves due to the stretchability of the microcolumn walls. In this example, if the microcolumn walls did not stretch, then the honeycomb structure could not be freely moved and stay parallel with the image display surface. FIGS. 9 and 10 provide an oblique view of how this array of tilting microcolumns would look as the outer honeycomb structure moves up and down in a plane parallel to the image display surface, tilting the microcolumns up and down in the process.

In the simple cross-sectional perspectives shown thus far, the array of tilting microcolumns is shown with the ends of the columns facing away from the image surface being tilted in just a one-dimensional linear manner. If the tilting motion were restricted to such one-dimensional linear movement, then the device would not create full three-dimensional viewing and parallax in all directions. The lines-of-sight from the small image elements would fan out into space in flat planes. However, the ends of the columns facing away from the image surface can be can be moved in two-dimensional patterns, including circles, spirals, squares, and zig-zag patterns. With such two-dimensional patterns, the lines-of-sight from the small image elements fan out into space in three-dimensions. In this manner, full three-dimensional viewing and parallax can be achieved in all directions. This is a significant advantage over methods in the prior art that use vertical slits and only offer horizontal parallax.

Figure 11:
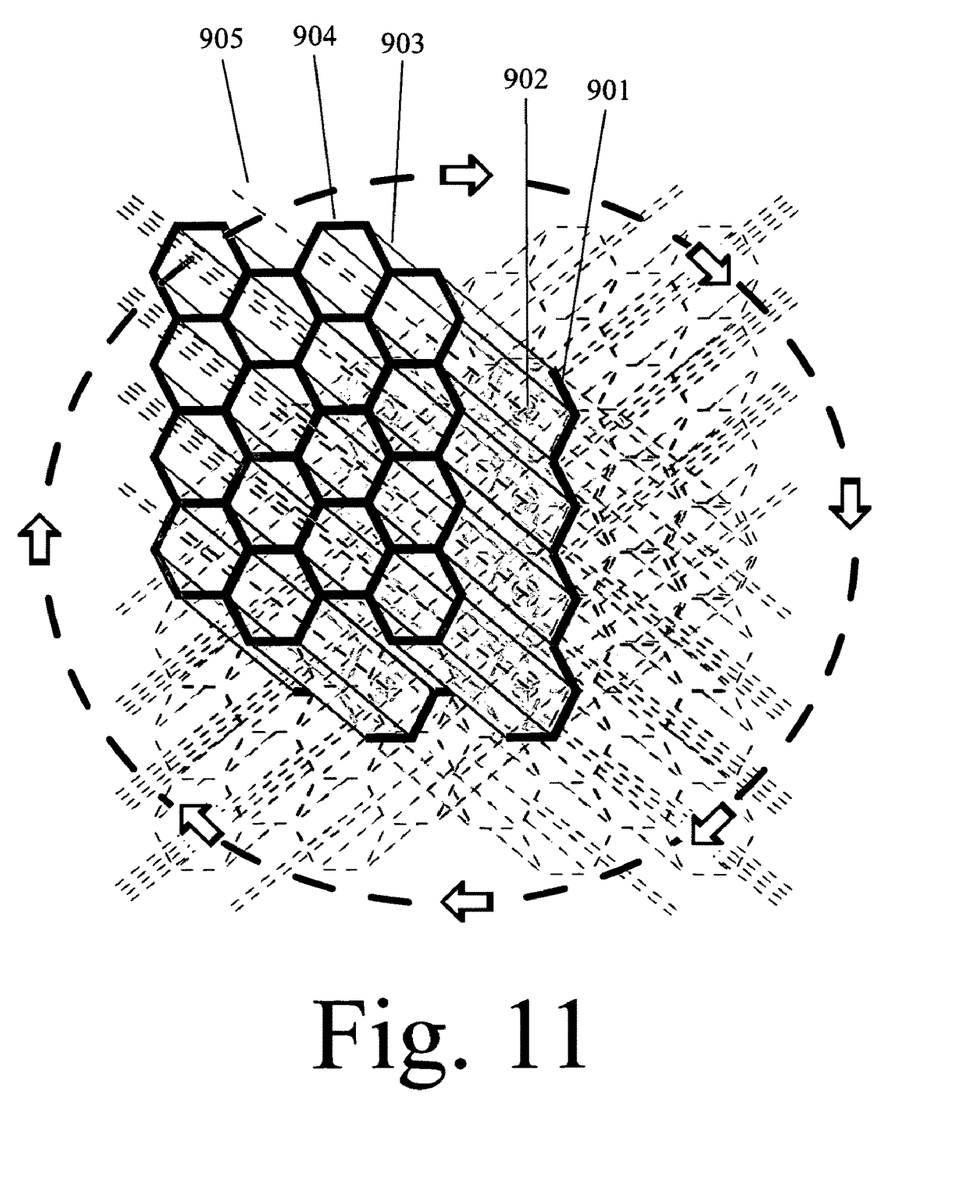
FIG. 11 shows this same honeycomb-style array, as the structure moves in a circle.

FIG. 11 shows the same honeycomb array of tilting microcolumns shown in FIGS. 9-10, but now the structure is shown moving in a two-dimensional path. Specifically, the two-dimensional path is a circle.

Figure 12:
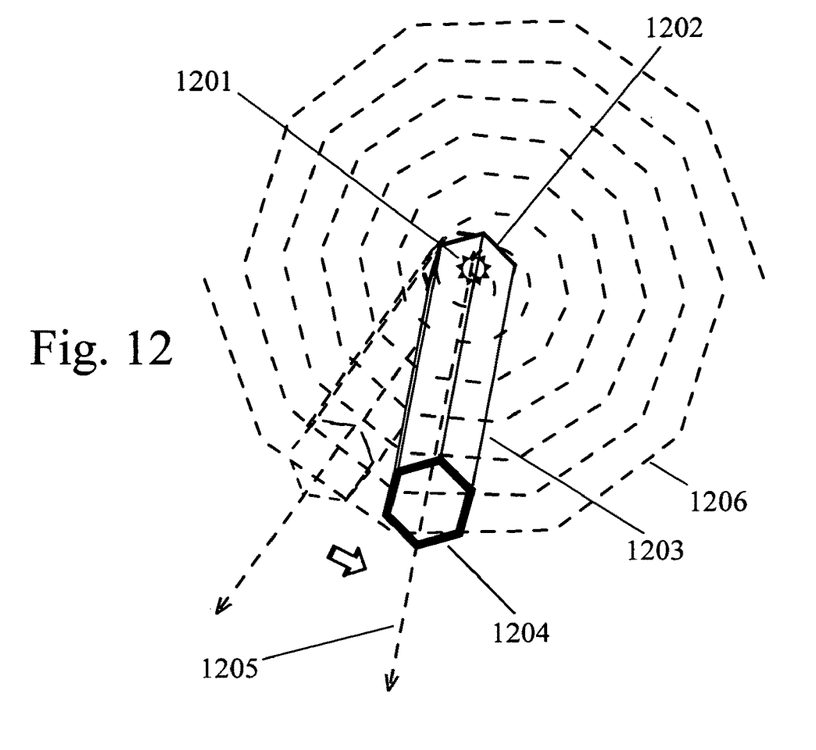
FIG. 12 focuses on one hexagonal microcolumn of a hexagonal array (the total array is not shown) as the microcolumn tilts around in a spiral path.

FIG. 12 focuses on one hexagonal microcolumn of a hexagonal array as the microcolumn tilts around in a spiral path 1206. Although this one hexagonal microcolumn is part of an array, the entire array is not shown to more clearly focus on the motion of a single column. All the other columns in the array would be moving in tandem with this one. Specifically, FIG. 12 shows one hexagonal end 1202 of the tilting microcolumn enclosing small image element 1201. In this example, the walls 1203 of the hexagonal tilting microcolumn are opaque and stretchable. The microcolumn is hollow. The end 1204 facing away from the image display surface is also a hexagon and is part of an outer honeycomb structure with the ends of other microcolumns that is not shown in this figure for the sake of reducing image clutter. In this example, the end 1204 of the microcolumn traces out a cyclical (in, then out, then in, then out) spiral path as the microcolumn tilts. In this manner, the line-of-sight 1205 from small image element, passing through the longitudinal axis of the microcolumn, traces out an expanding cone of light into the viewing space. Within this cone of light, people in different locations can see different content from the same point on the display surface. This creates three-dimensional images, with full parallax, without the need for special glasses.

Figure 13:
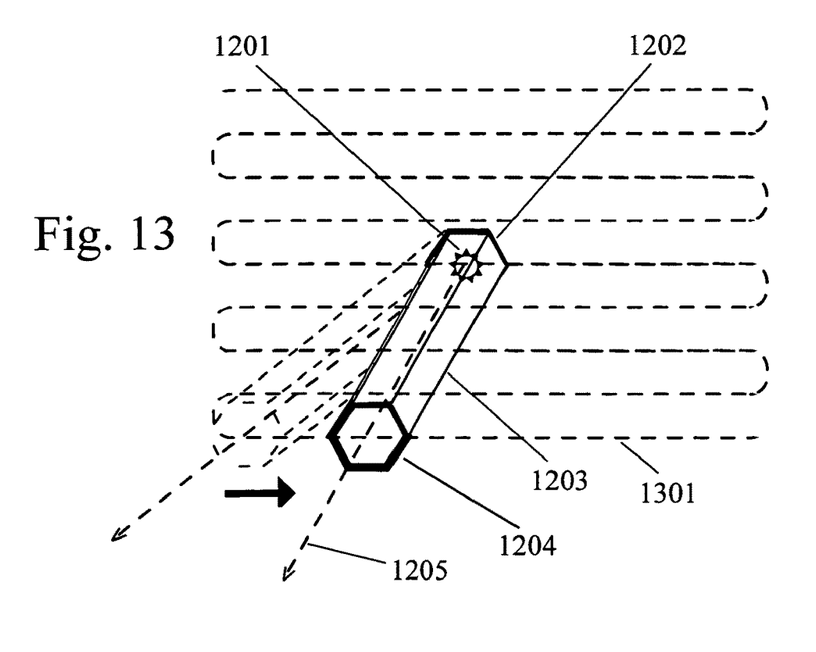
FIG. 13 focuses on one hexagonal microcolumn of a hexagonal array (the total array is not shown) as the microcolumn tilts back and forth in a zig-zag path.

FIG. 13 focuses on the same hexagonal microcolumn shown in FIG. 12, but in this example the microcolumn tilts in a zig-zag pattern 1301. In this manner, the line-of-sight 1205 from small image element, passing through the longitudinal axis of the microcolumn, traces out an expanding square-base-pyramid of light into the viewing space. Within this pyramid of light, people in different locations can see different content from the same point on the display surface. This creates three-dimensional images, with full parallax, without the need for special glasses.

Figure 14:
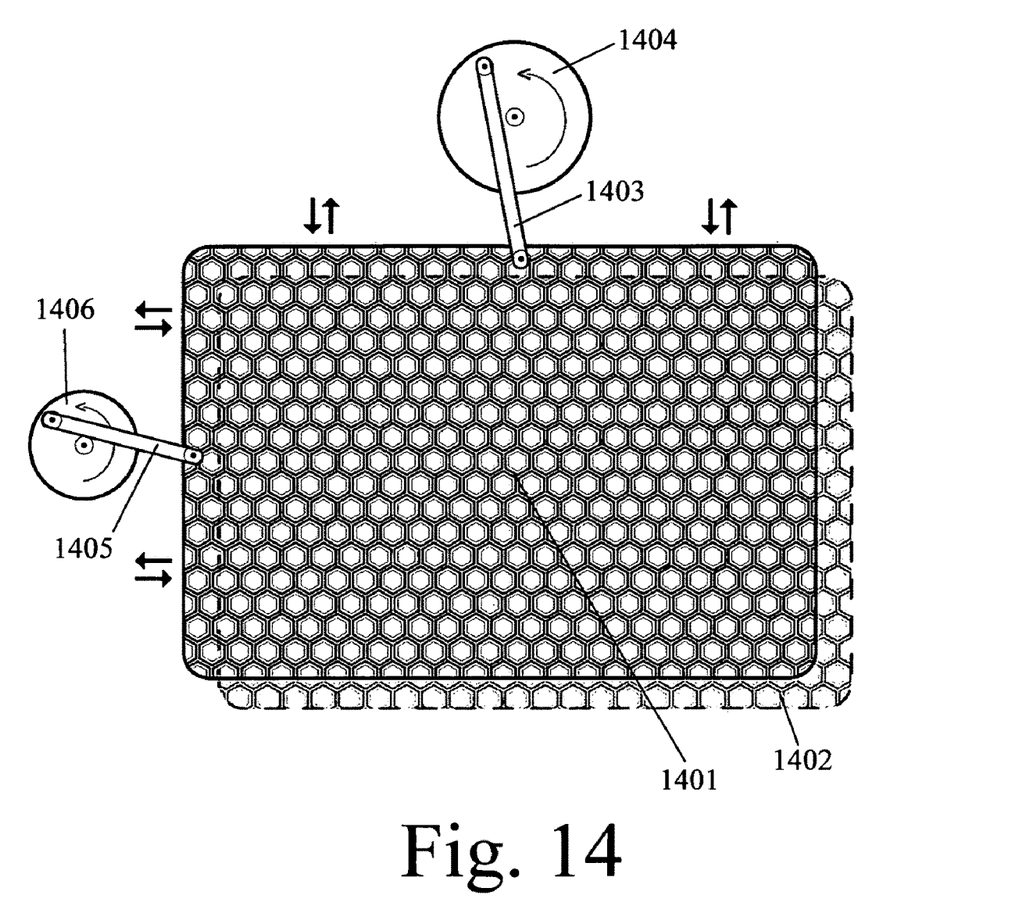
FIG. 14 shows one example of how the microcolumns may be tilted mechanically.

Thus far, we have shown microcolumns tilting along various paths, but have not specified what makes them tilt. There are a number of ways by which the microcolumns can be tilted. FIG. 14 shows one example of how they may be tilted by moving a honeycomb structure 1401 that connects all the microcolumn ends that face away from the image display surface. This honeycomb structure is moved in a plane that is generally parallel to the image display surface. In this example, there is also a second honeycomb structure 1402 that connects all the microcolumn ends that face toward the image display surface. In this example, this second honeycomb structure is stationary. With the ends of the microcolumns facing away from the image display surface being moved and the ends of the microcolumns facing toward the image display surface being stationary, the microcolumns all go through cyclical tilting motions.

In this example, the honeycomb structure 1401 farther away from the image display surface is moved in a two-dimensional path by its attachment to two rods (1403 and 1405) which are, in turn, attached to rotating wheels 1404 and 1406, which may be driven by electric motors. In another variation on this example, the microcolumns may be tilted by MEMS (Micro Electrical Mechanical Systems). In an alternative to direct mechanical tilting means, the array of tilting microcolumns may be moved in a two-dimensional pattern by changes in a surrounding electromagnetic field. A combination of mechanical and electromagnetically-induced tilting is also possible.

I claim:

1. A device for displaying three-dimensional images comprising:
   an image display surface, wherein this image display surface emits or reflects light to display an image comprised of multiple pixels, and
   an array of tilting microcolumns, wherein: each tilting microcolumn allows the passage of light from one pixel; wherein the interiors of these microcolumns allow the passage of light, but their walls block or reflect light; wherein each tilting microcolumn restricts the visibility of light rays passing through it to a line-of-sight that is generally along the central longitudinal axis of the microcolumn; wherein the end of the microcolumn that is closest to the image display surface moves little, or not at all, and the end of the microcolumn farthest from the image display surface moves in a generally circular, spiral, square, zig-zag, or other two-dimensional path in a plane that is relatively parallel to the image display surface; and wherein the image contents displayed by pixels are coordinated with the movement of the tilting microcolumns, through which those image contents pass, so that the view that would be seen of a real object from viewing angle X is displayed by the light ray emanating at angle X so as to create perception of three-dimensional images.

2. The device for displaying three-dimensional images in claim 1 wherein the image display surface has light emitting elements.

3. The device for displaying three-dimensional images in claim 1 wherein the image display surface has light reflecting elements.

4. The device for displaying three-dimensional images in claim 1 wherein each tilting microcolumn is a hollow column whose sides are formed by opaque or reflective material, which is attached at its ends to two parallel honeycomb-shaped structures, and wherein tilting action is caused by shifting these parallel structures relative to each other by mechanical means.

5. The device for displaying three-dimensional images in claim 1 wherein each tilting microcolumn has a magnetic charge, the end of the tilting microcolumn closest to the image display surface moves little, or not at all, and the end of the microcolumn farthest from image display surface moves in a path that is relatively parallel to the display surface, and wherein this movement is caused by the interaction between the microcolumn and an electromagnetic field.

6. A method for displaying three-dimensional images comprising:
   emitting light from, or projecting light onto, a display surface so as to create an image, and
   restricting lines-of-sight from points on this surface using an array of tilting pixel-specific microcolumns, wherein the end of the microcolumn that is closest to the image display surface moves little, or not at all, and the end of the microcolumn farthest from the image display surface moves in a two-dimensional manner, and wherein the angular directions of the light rays exiting these microcolumns form a light pattern that creates perception of three-dimensional images.

7. A device for displaying three-dimensional images comprising:
   an image display surface, wherein this image display surface emits or reflects light to display an image comprised of multiple pixels, and
   an array of tilting microcolumns, wherein: each tilting microcolumn allows the passage of light from one pixel; wherein the interiors of these microcolumns allow the passage of light, but their walls block or reflect light; wherein each tilting microcolumn restricts the visibility of light rays passing through it to a line-of-sight that is generally along the central longitudinal axis of the microcolumn; wherein the end of the microcolumn that is closest to the image display surface moves little, or not at all, and the end of the microcolumn farthest from the image display surface moves in a generally circular, spiral, square, zig-zag, or other two-dimensional path in a plane that is relatively parallel to the image display surface; and wherein the image contents displayed by pixels are coordinated with the movement of the tilting microcolumns, through which those image contents pass, so that the lines-of-sight that would be viewed from a real object radiate outwards from the two-dimensional surface toward the viewers at viewing angles so as to create perception of three-dimensional images.

\* \* \* \* \*